(12) United States Patent
Pei

(10) Patent No.: US 6,327,967 B1
(45) Date of Patent: Dec. 11, 2001

(54) ASSEMBLED MULTI-FUNCTIONAL MEAT ROAST FRAME

(76) Inventor: Jainn-Nan Pei, No. 32-1, Ming-der street, Liou-tshoh Tsuen, Hua-Tarn Shiang, Chang Hwa Hsien (TW)

( * ) Notice: Subject to any disclaimer, the term of this patent is extended or adjusted under 35 U.S.C. 154(b) by 0 days.

(21) Appl. No.: 09/792,241

(22) Filed: Feb. 26, 2001

(51) Int. Cl.⁷ ................................. A23L 1/00; A47J 37/00
(52) U.S. Cl. ................................. 99/339; 99/340; 99/357; 99/421 H; 99/446; 99/450; 99/482; 126/9 R; 126/25 R; 126/30
(58) Field of Search ............................. 99/339, 340, 357, 99/419–421 V, 426, 444–450, 400, 401, 481, 482; 126/9 R, 25 R, 25 A, 30, 41 R, 25 AA, 29, 506

(56) References Cited

U.S. PATENT DOCUMENTS

| D. 356,005 | * | 3/1995 | Goble | D7/337 |
|---|---|---|---|---|
| 2,811,099 | * | 10/1957 | McGoldrick | 99/421 H |
| 3,946,653 | * | 3/1976 | Pugh | 99/340 |
| 4,011,804 | * | 3/1977 | Crockett, Sr. | 99/421 H |
| 4,109,567 | * | 8/1978 | Gage et al. | 99/450 |
| 4,393,857 | * | 7/1983 | Sanford | 126/25 R |
| 4,815,367 | * | 3/1989 | Hanson et al. | 99/421 H |
| 4,829,977 | * | 5/1989 | Valentine | 126/9 R |
| 4,856,423 | * | 8/1989 | Burns | 99/449 X |
| 5,025,715 | * | 6/1991 | Sir | 99/421 HV |
| 5,117,806 | * | 6/1992 | Soat | 99/339 X |
| 5,287,844 | * | 2/1994 | Fieber | 126/30 |
| 5,452,706 | * | 9/1995 | Meza | 99/339 X |

* cited by examiner

Primary Examiner—Timothy F. Simone

(57) ABSTRACT

A meat roasting frame has a frame formed by assembling a plurality of connecting rods and a plurality of angle connectors. In using, it is only necessary to combine the connecting rods with the angle connectors. The frame can be divided into a plurality of layers for supporting a fuse receiver and food receiver. Furthermore, rotary rods for supporting larger food can be installed therein so as to be formed as a meat roasting frame for baking) cooking and roasting Mongolian food, etc. Meanwhile, it can be stored with less space.

1 Claim, 6 Drawing Sheets

ASSEMBLED MULTI-FUNCTIONAL MEAT ROAST FRAME

FIELD OF THE INVENTION

The present invention relates to an assembled multi-functional meat roast frame for baking, cooking and roasting Mongolian food, etc. Meanwhile, it can be stored with less space.

BACKGROUND OF THE INVENTION

A meat roasting frame is necessary in many outdoor activities. In general, there are many shapes for meat roasting frames. For example, Taiwan Patent No. 245944 discloses "an assembled type meat roasting frame" which is mainly formed by round tubes (3), baking disks (4), a fuse disk (5), hooks (6) and connecting pieces (7). In storing, these components are detachable for reducing the volume thereof. However, in using, all the meat roasting frames have only a single function of baking, and thus if it is desired to cook soup or baking Mongolian foods, other cooking device is necessary. Therefore, many cooking devices are necessary to be carried in outdoor activities.

SUMMARY OF THE INVENTION

Accordingly, the primary object of the present invention is to provide an assembled multi-functional meat roast frame with multiple functions in cooking.

To achieve above objects, the present invention provides a meat roasting frame has a frame formed by assembling a plurality of connecting rods and a plurality of angle connectors. In using, it is only necessary to combine the connecting rods with the angle connectors. The frame can be divided into a plurality of layers for supporting a fuse receiver and food receiver. Furthermore, rotary rods for supporting larger food can be installed therein so as to be formed as a meat roasting frame for baking, cooking and roasting Mongolian food, etc. Meanwhile, it can be stored with less space.

The various objects and advantages of the present invention will be more readily understood from the following detailed description when read in conjunction with the appended drawing.

DETAILED DESCRIPTION OF THE PREFERRED EMBODIMENTS

Figure 1:
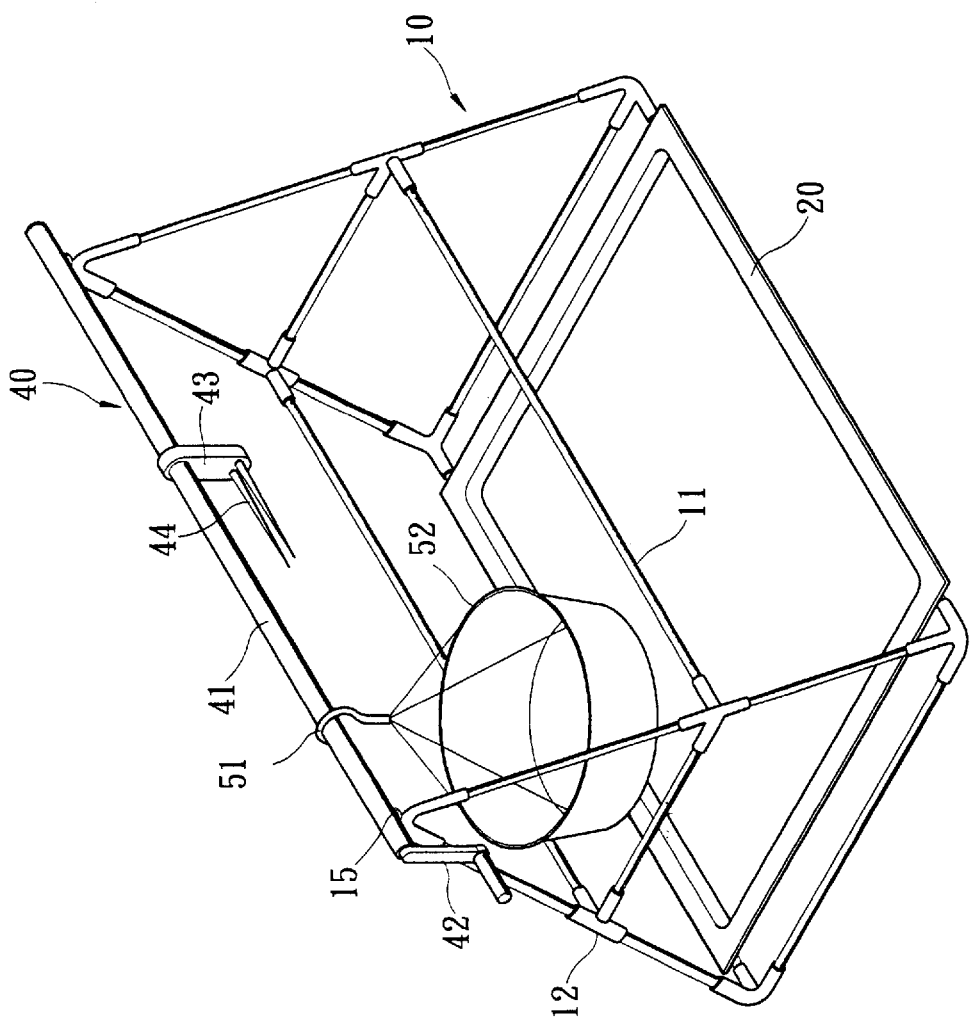
FIG. 1 is a schematic perspective view of the frame in the present invention.
Figure 2:
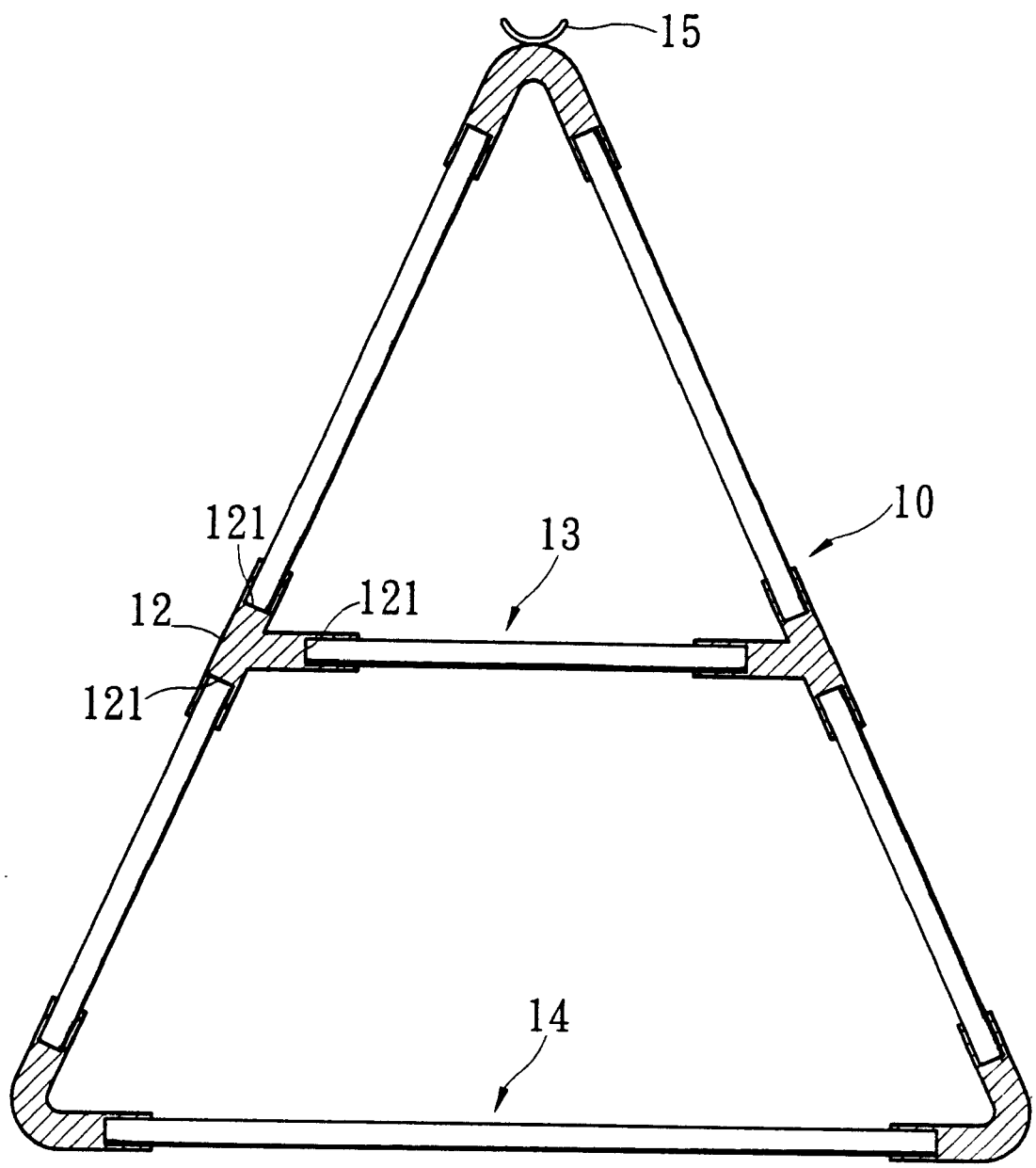
FIG. 2 is a schematic cross sectional view of the frame in the present invention.

Referring to FIGS. 1 and 2, the perspective view and the lateral cross sectional view of the present invention are illustrated. Other than providing the function of meat roasting, the meat roasting frame of the present invention further has the function of cooking and baking Mongolian food, As illustrated in the drawings, the meat roasting frame has a structure which can be detached or assembled. The meat roasting frame of the present invention has a frame 10 formed by assembling a plurality of connecting rods 11 and a plurality of angle connectors 12. The connecting rod 11 has a round, polygonal, or other shape end surface. The angle connector 12 is formed with at least two engaging grooves 121 in different radial directions. Each engaging groove 12 is matched to the shape of the connecting rod 11 so as to be engaged with the connecting rod 11. In application, the connecting rod 11 may be tightly engaged, screwed, or buckled with the engaging groove 121 so that the connecting rod 11 can be combined with the angle connector 12.

After the frame 10 is assembled, it has at least two supporting platforms 13, 14. This two supporting platforms 13, 14 are formed by a plurality of connecting rods 11 at the same horizontal surface. Thereby, the two supporting platforms 13, 14 are placed across a fuse receiver (a bowl or a platform) and the standby food receiver 30 (a baking disk or a baking net).

Figure 3:
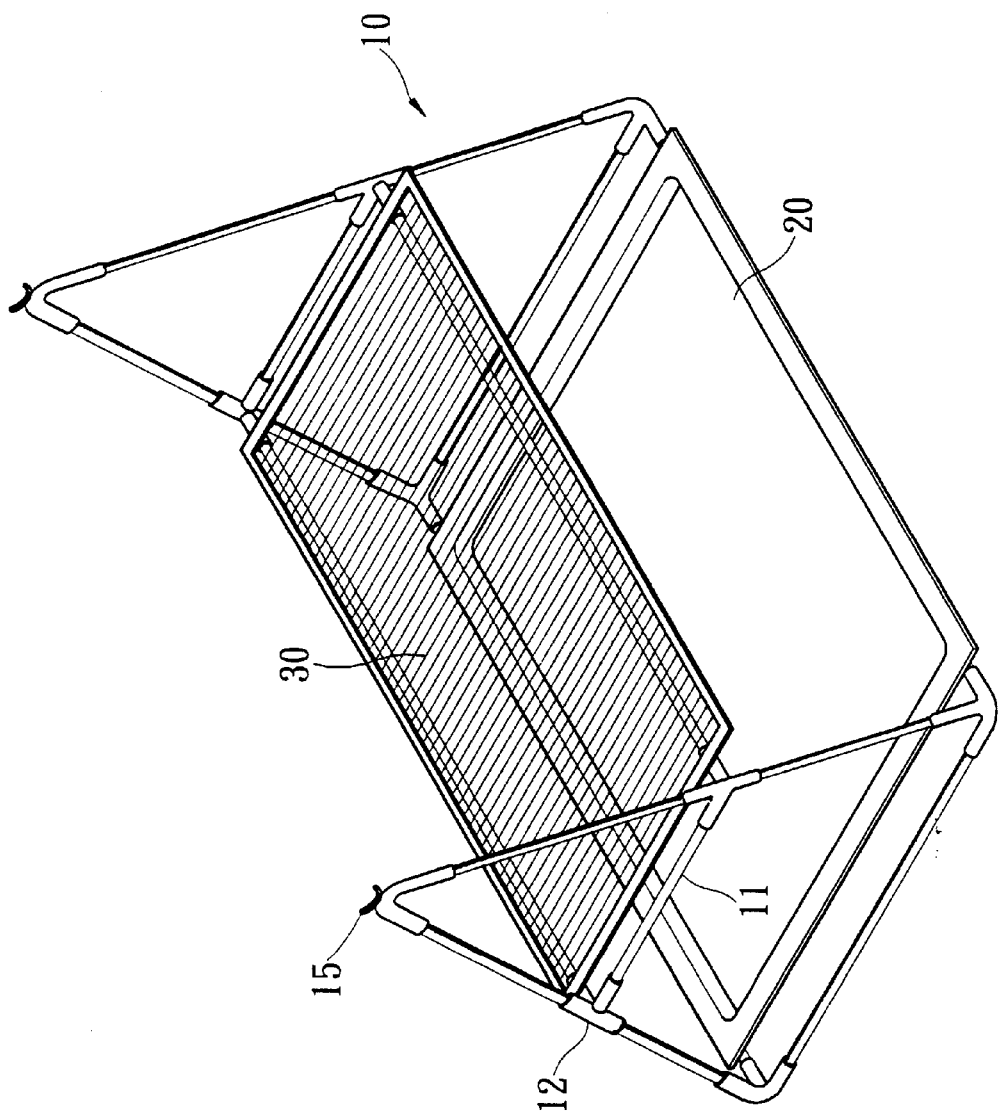
FIG. 3 is a schematic view showing the use of the present invention.
Figure 5:
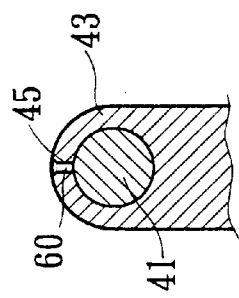
FIG. 5 is an enlarged schematic view showing the combining of the rotary rod and the hook element.
Figure 4:
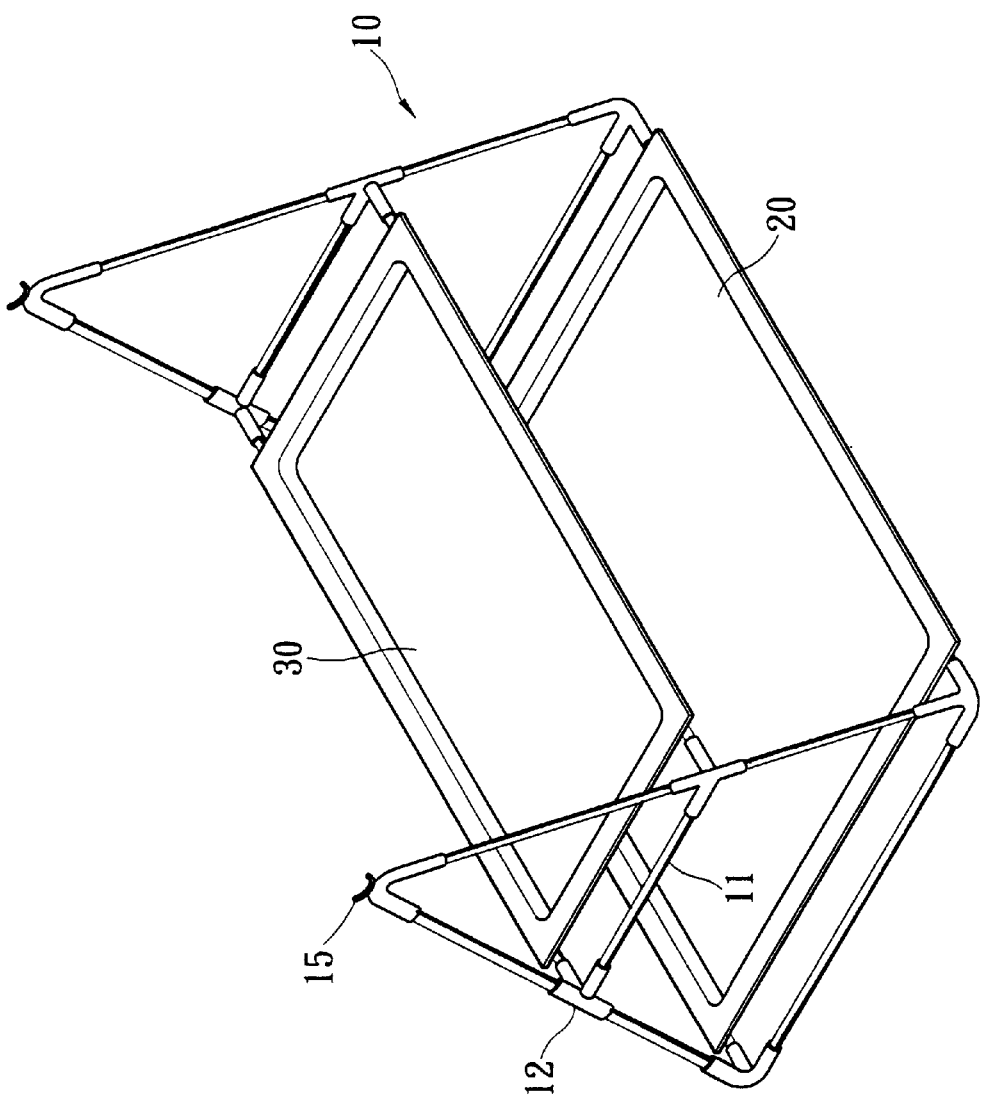
FIG. 4 is a schematic view showing the another application of the present invention.

By the aforesaid structure, the fuse receiver 20 is placed on the lowest supporting platform 14 so that heat source may be added above the frame 10. The food receiver 30 may be placed on another supporting platform 13 on the fuse receiver 20. In application, the fuse receiver 20 may be a net plate with lattices (referring to FIG. 3) or a bowl (referring to FIG. 4). The heat from heat source is used to roast, cook, or fry foods.

Besides, in the present invention, a rotary rod 40 is mounted on the frame 10. This rotary rod 40 is placed on another supporting platform above the fuse receiver 20 or is mounted on the supporter 15 of the frame 10 so as to be placed across the fuse receiver 20. Thus rotary rod 40 is formed by an axial rod 41, and a swing rod 42 on the axial rod 41. Therefore, if a large food is desired to be roasted (for example, baking Mongolian food), the food can be directly inserted by the axial rod 41. By the swing rod 42 to rotate the axial rod 41, the food can be roasted uniformly. Meanwhile, some pots 52 with hooks 51 can be hooked to the axial rod 41 so that during the process of baking, they may be used to cook food.

Besides, in application, hook 43 can be further installed on the axial rod 41. The hook 43 is installed with slender and sharp food suspending portion 44. As the food is not convenient to be connected to the axial rod 41, then it can be hooked to the hook 43 of the axial rod 41. This hook 43 may be fixedly combined to or separated from the axial rod 41. Furthermore, the radial direction thereof has screw elements 60 for locking to the screw holes 45 of the axial rod 41.

Figure 6:
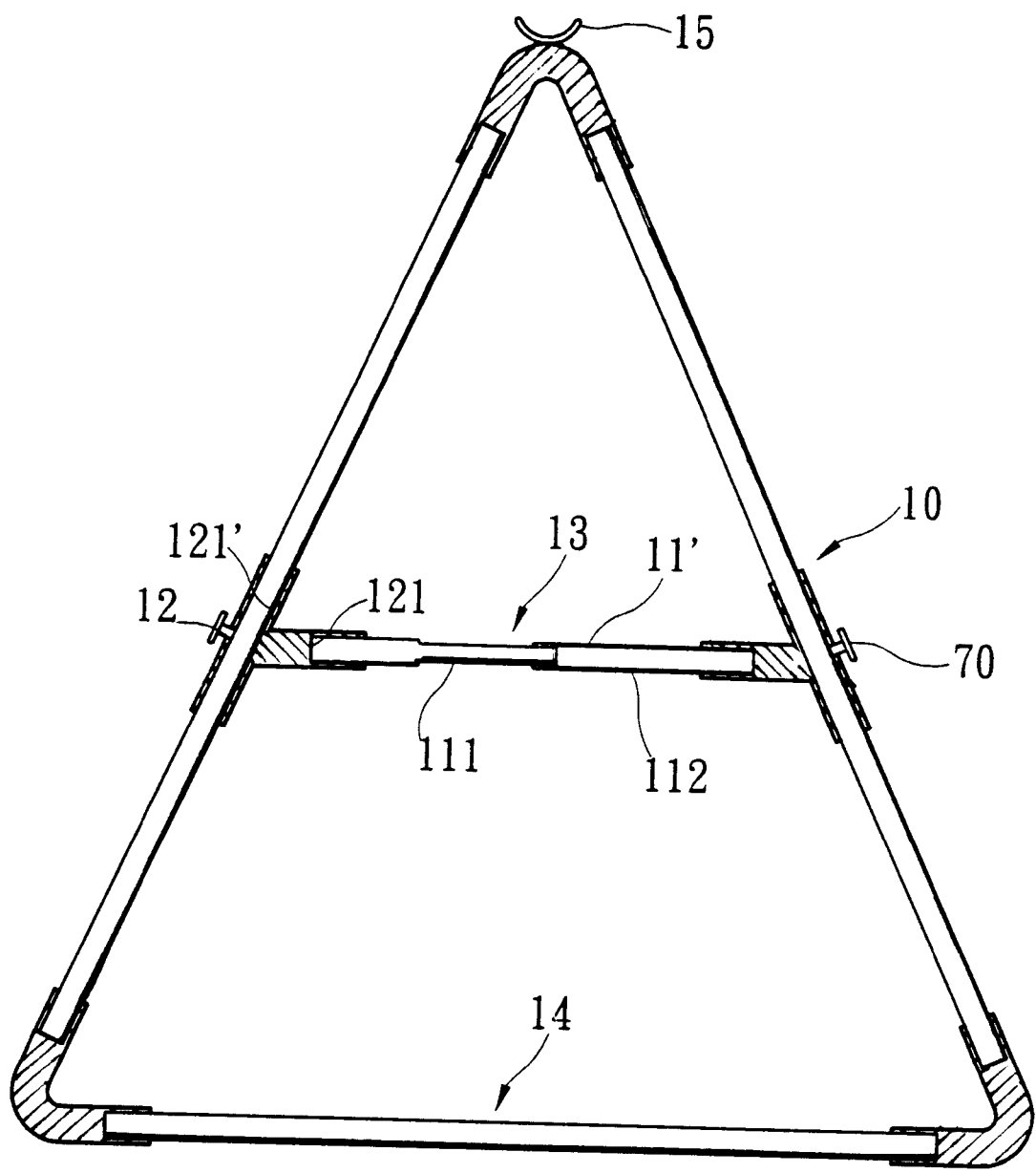
FIG. 6 shows another embodiment of the present invention.
Figure 7:
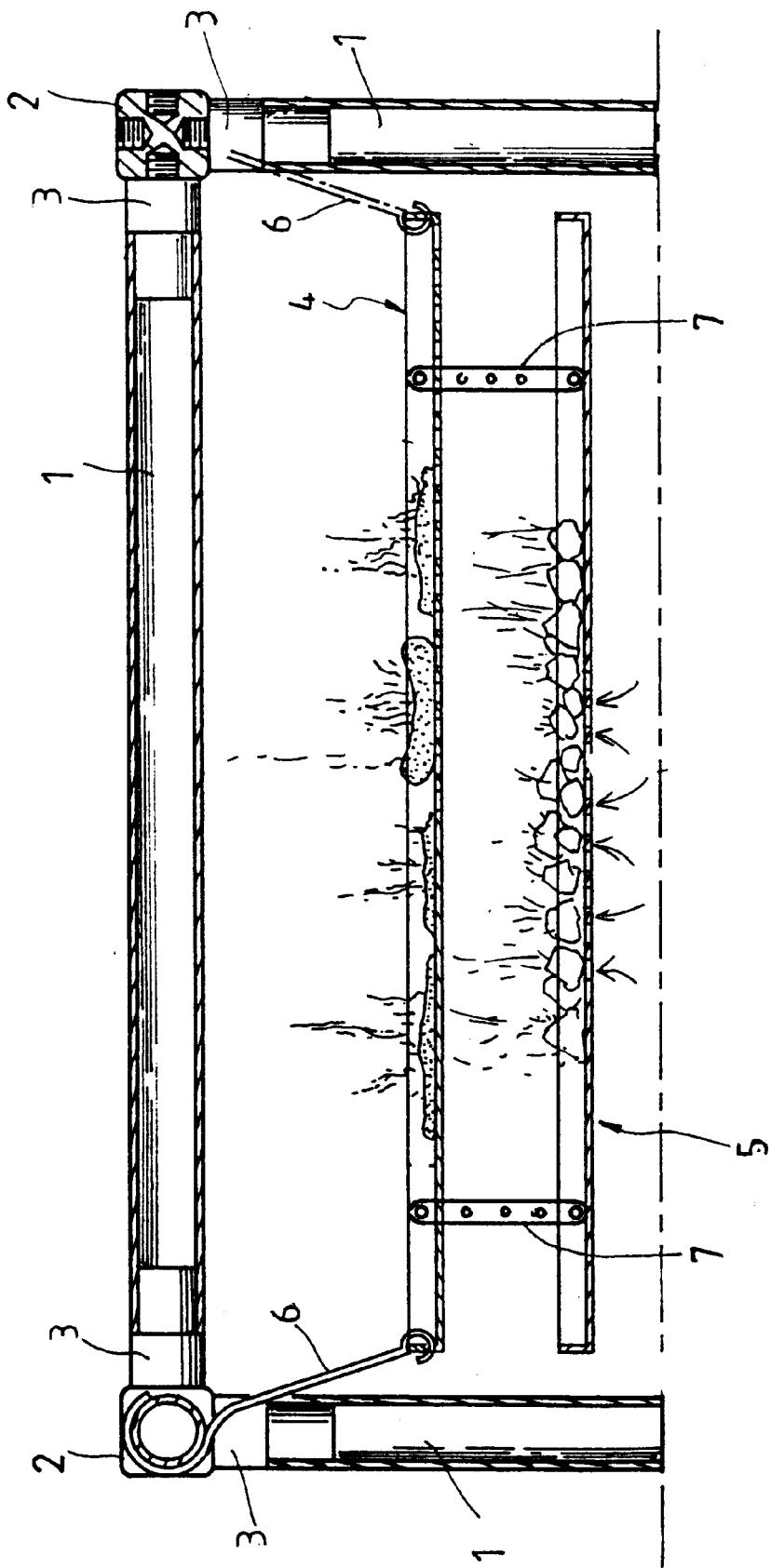
FIG. 7 is a structural cross sectional view of a prior art meat roasting frame.

Referring to FIG. 6, in the present invention, the two supporting platforms 13, 14 of the fuse receiver 20 and the food receiver 30 are adjustable according to the requirement. Therefore, the connecting rods 11 of the two supporting platforms 13, 14 are movable along a vertical direction. In application, the angle connector 12 may be formed as a through hole with respect to the engaging groove 121'. Moreover, a locking unit 70 (for example, a stud or a pin) for fixing the angle connector with respect to the connecting rod is formed. Therefore, after the angle connector vertically displaces along the connecting rod, it can be fixed to a proper height for adjusting the distance between the two supporting platforms 13, 14. Besides, the connecting rod 11' is a telescopic rod which is formed by engaging an inner tube 111 with an outer tube 112.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An assembled multi-functional meat roast frame comprising:
   a plurality of connecting rods;
   a plurality of angle connectors installed at least two engaging grooves at different radial directions for being engaged with the connecting rods so as to be formed as a frame with a multiple of platforms; wherein the frame is installed with a support for supporting a rotary rod;
   a fuse receiver for being placed on a lower platform for receiving fuse;
   a baking means or net plate installed on another platform of the frame; and
   a rotary rod installed on the frame, the rotary rod being formed by an axial rod, and a swing rod installed on an edge of the axial rod, wherein the axial rod is installed with a hook for inserting a series of foods, the hook is installed with screws for being connected to the rotary rod.

* * * * *